United States Patent
Tsukamoto et al.

(10) Patent No.: US 8,481,885 B2
(45) Date of Patent: Jul. 9, 2013

(54) LASER NARROW GROOVE WELDING APPARATUS AND WELDING METHOD

(75) Inventors: Takeshi Tsukamoto, Mito (JP); Hirotsugu Kawanaka, Hitachi (JP); Yoshihisa Maeda, Tsuchiura (JP); Shinji Imaoka, Omitama (JP); Tetsuya Kuwano, Tsuchiura (JP); Taiji Hashimoto, Tsuchiura (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 310 days.

(21) Appl. No.: 12/825,549

(22) Filed: Jun. 29, 2010

(65) Prior Publication Data
US 2010/0326969 A1     Dec. 30, 2010

(30) Foreign Application Priority Data

Jun. 29, 2009    (JP) .................................. 2009-153210

(51) Int. Cl.
*B23K 26/00*     (2006.01)

(52) U.S. Cl.
USPC .............. 219/121.64; 219/121.6; 219/121.63; 219/121.83; 219/121.85

(58) Field of Classification Search
USPC ............... 219/121.6, 121.63, 121.64, 121.83, 219/121.85
See application file for complete search history.

(56) References Cited

U.S. PATENT DOCUMENTS

| 5,665,255 A | * | 9/1997 | Busuttil | 219/121.63 |
| 2005/0211687 A1 | * | 9/2005 | Sonoda et al. | 219/137 R |
| 2006/0201915 A1 | | 9/2006 | Obana et al. | |

FOREIGN PATENT DOCUMENTS

| CN | 2905302 | 5/2007 |
| JP | 9-182983 | 7/1997 |
| JP | 09-201687 | 8/1997 |
| JP | 2003-71583 | 3/2003 |
| JP | 2007-000920 | 1/2007 |

* cited by examiner

*Primary Examiner* — Tan N Tran

(74) *Attorney, Agent, or Firm* — Antonelli, Terry, Stout & Kraus, LLP.

(57) ABSTRACT

A welding apparatus and a welding method are employed for laser narrow groove welding which performs welding scanning a laser beam in the welding direction while feeding a solid filler metal into a narrow groove. The welding apparatus includes a laser beam irradiation head having a mechanism periodically oscillating an irradiation point of the laser beam with a predetermined amplitude in the bottom of the groove, and a filler metal control device having a solid filler metal feeder feeding the solid filler metal to the molten pool formed in the bottom of the groove by the laser beam and adjusting the feeding position independent of a motion of the laser beam irradiation head so that the tip position of the solid filler metal detected is constantly positioned in the center of the groove.

8 Claims, 4 Drawing Sheets

LASER NARROW GROOVE WELDING APPARATUS AND WELDING METHOD

CLAIM OF PRIORITY

The present application claims priority from Japanese patent application serial No. 2009-153210 filed on Jun. 29, 2009, the content of which is hereby incorporated by reference into this application

BACKGROUND OF THE INVENTION

1. Field of the Invention

The present invention relates to a buildup welding apparatus and a welding method for a thick plate by a laser beam.

2. Description of the Related Art

With respect to welding of a thick plate of steel, nickel base alloy and the like, a method of forming a groove in a welding section and filling the groove by buildup welding of a plurality of passes while feeding a filler metal such as a welding wire and welding rod is commonly adopted, however, because the cross-sectional area of the groove increases as the plate thickness increases, the method involves problems such as drop of the manufacturing efficiency due to increase in the number of weldpass and degradation of the welding quality due to increase of deformation and welding distortion.

Therefore, narrow groove welding methods narrowing the groove and reducing the required deposited metal amount have been developed, and with respect to a heat source also, such efforts of improving the directivity of an arc, adopting a laser beam with high focusing performance, and the like to cope with narrowing of the groove have been made. With respect to the laser particularly, output power and focusing performance have been remarkably improved due to the progress of oscillators in recent years, and as described in the Japanese Unexamined Patent Application Publication No. H09-201687 for example, narrowing of the groove that has never been achieved by a conventional heat source for an arc is possible.

According to narrow groove welding by a laser described above, the convergence of energy is high, and therefore the width of the formed weld bead generally becomes narrower than that in arc welding. On the other hand, the shape of the groove is determined so as to avoid interference with the laser beam, whereas the laser beam is irradiated to the bottom of the groove from a focusing lens with a constant converging angle according to the focal length of the lens, and therefore, as the plate thickness of the welding section increases and the depth of the groove becomes deeper, the required width at the upper part of the groove becomes larger. Accordingly, there was a problem that, even if sound welding of one pass per one layer was possible in the lower part of the groove, lack of fusion was liable to occur between the wall of the groove and the weld bead as building up progressed to the upper part of the groove.

Also, in the laser narrow groove welding, there was a problem that the solid filler metal such as a welding wire and welding rod was liable to be fed in a state shifted to the direction of the side wall of the groove because the width of the groove was small, and the deposited metal formed shiftingly to the side wall direction became an obstacle in feeding the filler metal in welding the following layer, which impeded sound welding.

Further, in the laser narrow groove welding, there was a problem that metal gas that was generated by irradiation of the laser beam filled inside the narrow groove, scattered the laser beam, and lowered the heat input efficiency to the welding section. The object of the present invention is to solve the problems of the conventional technology described above.

(Means to Solve the Problems)

SUMMARY OF THE INVENTION

The present invention provides a laser narrow groove welding apparatus in which welding is performed by scanning a laser beam in the welding direction while feeding a solid filler metal into a narrow groove and melting the solid filler metal and a material to be welded in a molten pool formed in the bottom of the groove. The laser narrow groove welding apparatus includes a laser beam irradiation head periodically changing a laser beam irradiation amount in the bottom of the groove, and a filler metal control device having a solid filler metal feeder feeding the solid filler metal to the molten pool and a position detecting device detecting a tip position of the solid filler metal and adjusting the position of the solid filler metal independent of a motion of the laser beam irradiation head so that the tip of the solid filler metal is constantly positioned in the center of the groove.

Also, the laser beam irradiation head may periodically oscillate an irradiation position of the laser beam in the bottom of the groove with predetermined amplitude in parallel with the bottom of the groove.

Also, the filler metal control device may periodically change a feed rate of the solid filler metal by the solid filler metal feeder synchronizing with the period of oscillating the irradiation position of the laser beam in the bottom of the groove.

Also, the laser beam irradiation head may periodically change the size of a focused laser beam spot in the bottom of the groove within a predetermined dimensional range.

Also, the filler metal control device may periodically change a feed rate of the solid filler metal by the solid filler metal feeder synchronizing with the period of changing the size of a focused laser beam spot in the bottom of the groove.

Also, the laser narrow groove welding apparatus may further include a shielding gas feeding device having an inner nozzle ejecting shielding gas to the molten pool while maintaining the center distance of a tip of the inner nozzle inserted to the groove and the focused laser beam spot at a predetermined interval and an outer nozzle forming a double tube structure accommodating the inner nozzle and ejecting the shielding gas to the periphery of the molten pool.

Also, the laser narrow groove welding apparatus may further include a shielding gas feeding device in which the outer nozzle is positioned outside the groove and the distance between a tip of the outer nozzle and the upper part of the groove is maintained at a predetermined interval.

The present invention further provides a laser narrow groove welding method in which welding is performed by scanning a laser beam in a welding direction while a solid filler metal is fed into a narrow groove and the solid filler metal and a material to be welded are molten in a molten pool formed in the bottom of the groove. The laser narrow groove welding method includes periodically changing a laser beam irradiation amount in the bottom of the groove, detecting a tip position of the solid filler metal, and adjusting the position of the solid filler metal independent of a motion of the laser beam irradiation head so that the tip of the solid filler metal is constantly positioned in the center of the groove.

Also, the laser narrow groove welding method may further include a step of periodically oscillating an irradiation position of the laser beam in the bottom of the groove with predetermined amplitude in parallel with the bottom of the groove.

Also, the laser narrow groove welding method may further include a step of periodically changing a feed rate of the solid filler metal of a solid filler metal feeder synchronizing with the period of oscillating the irradiation position of the laser beam in the bottom of the groove.

Also, the laser narrow groove welding method may further include a step of periodically changing the size of a focused laser beam spot within a predetermined dimensional range in the bottom of the groove.

Also, the laser narrow groove welding method may further include a step of periodically changing a feed rate of the solid filler metal of the solid filler metal feeder synchronizing with the period of changing the size of the focused laser beam spot in the bottom of the groove.

Also, the laser narrow groove welding method may further include a step of feeding shielding gas by ejecting the shielding gas from an inner nozzle to the molten pool while maintaining the center distance of a tip of the inner nozzle inserted to the groove and the focused laser beam spot, and ejecting the shielding gas from an outer nozzle to the periphery of the molten pool.

Also, the laser narrow groove welding method may further include a step of feeding shielding gas with the outer nozzle being positioned outside the groove and with the distance between a tip of the outer nozzle and the upper part of the groove being maintained at a predetermined interval.

According to an aspect of the present invention, lack of fusion occurring between the side wall of the upper part of the groove and the weld bead is inhibited and sound laser narrow groove welding becomes possible even when the plate thickness of the welding section increases by providing a laser beam irradiation head periodically changing a laser beam irradiation amount in the bottom of the groove and a filler metal control device adjusting the feeding position independent of a motion of the laser beam irradiation head so that the tip of the solid filler metal is constantly positioned in the center of the groove.

Also, according to an aspect of the present invention, a problem that the feeding position of the solid filler metal shifts to the side wall side of the groove and solid filler metal is deposited on the side wall of the groove which disturbs feeding of the solid filler metal in welding the following layer can be prevented.

DETAILED DESCRIPTION OF THE PREFERRED EMBODIMENTS

According to a first embodiment of the present invention, in narrow groove welding of a thick plate using a laser, poor weld is inhibited by using a welding apparatus including a laser beam irradiation head periodically oscillating an irradiation position of a laser beam with predetermined amplitude in the bottom of a groove, and a filler metal control device feeding a solid filler metal such as a welding wire and a welding rod to a molten pool formed in the bottom of the groove by the laser beam, detecting the tip position of the solid filler metal, and adjusting the feeding position independent of a motion of the laser beam irradiation head so that the tip of the solid filler metal is constantly positioned in the center of the groove.

Also, according to a second embodiment of the present invention, poor weld is inhibited by using a welding apparatus including a laser beam irradiation head periodically changing the size of a focused laser beam spot in the bottom of the groove within a predetermined dimensional range, and a solid filler metal feeder feeding a solid filler metal to a molten pool formed in the bottom of the groove by the laser beam, detecting the tip position of the solid filler metal, and adjusting the feeding position independent of a motion of the laser beam irradiation head so that the tip of the filler metal is constantly positioned in the center of the groove.

[First Embodiment]

Figure 1:
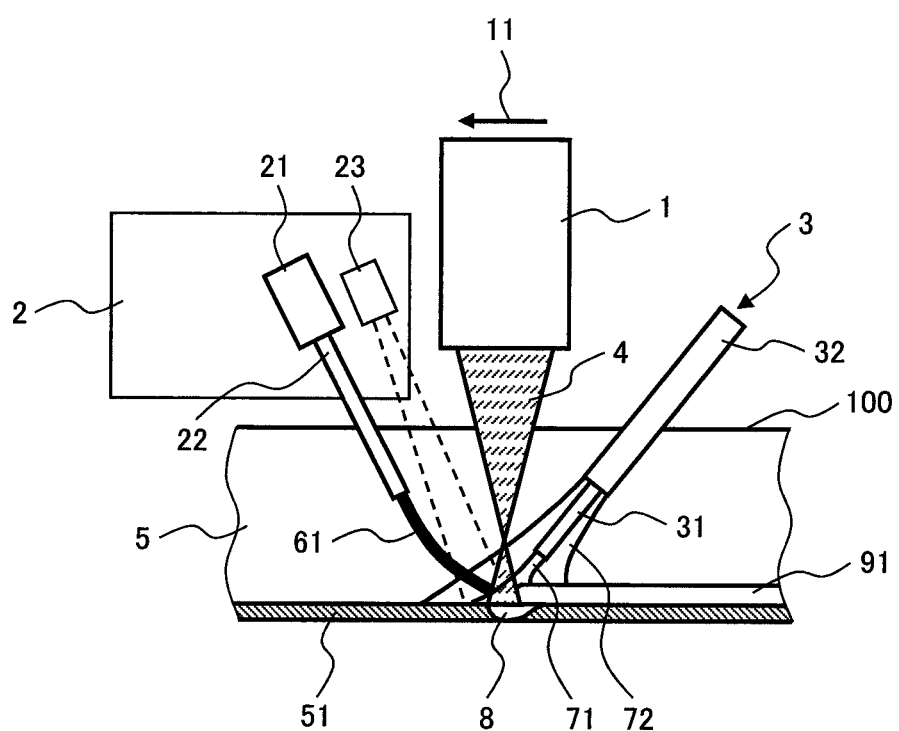
FIG. 1 is a schematic view showing a first embodiment of the present invention.

FIG. 1 is a schematic view showing the constitution of the welding apparatus and the welding process of a first embodiment of the present invention, and roughly shows the inside of the groove as viewed from a side in the welding direction. Reference numeral 1 is a laser beam irradiation head with 10 kw output, 11 is the welding direction, 2 is a filler metal control device, 21 is a filler metal feeder, 22 is a filler metal feeding nozzle, 23 is an imaging camera as a filler metal tip position detecting device, 3 is a shielding gas feeding device, 31 is an inner nozzle, 32 is an outer nozzle, 4 is a laser beam, 5 is a groove, 51 is the bottom of the groove, 61 is a welding wire as a solid filler metal, 71 is a flow of shielding gas from the inner nozzle 31, 72 is a flow of shielding gas from the outer nozzle 32, 8 is a molten pool, 91 is a weld bead, and 100 is a material to be welded. In the first embodiment, the material of the material to be welded was made of stainless steel SUS304 (JIS: Japanese Industrial Standards), the material of the welding wire was made of Y308L (JIS), and the shielding gas was made nitrogen.

The welding wire 61 was continuously fed to a molten pool 8 of a metal meltingly formed by the laser beam 4 from the front in the welding direction 11 by the filler metal feeder 21 through the filler metal feeding nozzle 22, and the weld bead 91 was formed. Then, metal vapor generated from the molten pool 8 is blown off by the flow 71 of the shielding gas ejected from an inner nozzle 31 of a shielding gas feeding device 3 toward the molten pool 8, and scattering of the laser beam 4 is prevented. Also, oxidation of a heated region in the vicinity of the welding section by the air is suppressed by the flow 72 of the shielding gas ejected from the outer nozzle 32 toward the periphery of the molten pool 8.

Figure 2A:
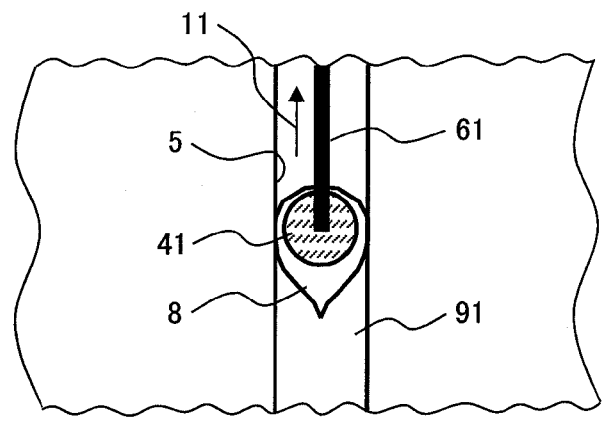
FIG. 2A is a schematic plan view showing a positional relation of the groove, the welding wire, and oscillating motion of the laser beam in the first embodiment of the present invention.
Figure 2B:
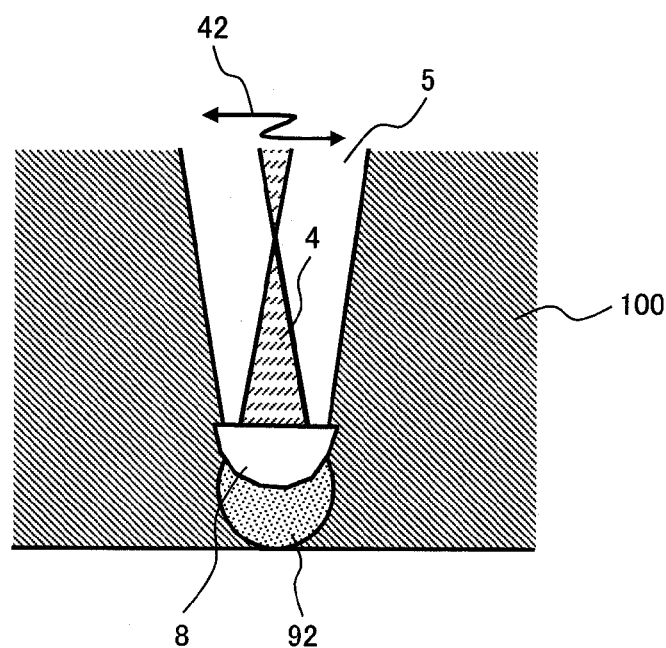
FIG. 2B is a schematic cross-sectional view showing a positional relation of the groove, the welding wire and oscillating motion of the laser beam in the first embodiment of the present invention.

FIG. 2A is a schematic plan view roughly showing the welding section as viewed from the upper part of a groove 5, and FIG. 2B is a schematic cross-sectional view roughly showing a cross-section orthogonal to the longitudinal direction of the groove 5 as viewed from the front in the welding direction 11. Reference numeral 11 shows the welding direction. Reference numeral 41 is a focused laser beam spot, 42 is an oscillating direction of the laser beam 4 which is parallel with the bottom of the groove, and 92 is a weld bead formed in the previous weldpass.

By periodically oscillating the laser beam 4 with predetermined amplitude in the direction orthogonal to the welding direction 11 in the bottom of the groove 5 while scanning the laser beam irradiation head 1 in the welding direction 11, thermal energy is supplied to the welding section sufficiently and evenly, and lack of fusion that may occur between the side wall of the groove 5 and the weld bead 91 can be suppressed. The amplitude of oscillation of the laser beam 4 was made approximately a value obtained by subtracting the diameter of the focused laser beam spot 41 from the groove width of the welding section, and the frequency of oscillation was made the range of 10-50 Hz according to the thermal condition, structural condition and the like in which the welding apparatus can be operated stably.

In the welding process described above, feeding rate control of the welding wire 61 is performed with the filler metal feeder 21 by a filler metal control device 2 synchronizing with the oscillation period of the laser beam 4. That is, the periodical feed rate control is performed in which the feed rate of the welding wire 61 is made local maximum when the laser beam focusing spot 41 is positioned in the center of the groove 5, and the feed rate of the welding wire 61 is made local minimum when the laser beam focusing spot 41 is brought closest to the side wall of the groove 5. With such control, an optimal amount of the welding wire is fed according to the heat supply amount, and stable welding free from defects becomes possible without causing lack of fusion of the welding wire 61.

Also, the tip position of the welding wire 61 is detected by the imaging camera 23, and adjusting is performed by the filler metal control device 2 so that the tip of the welding wire 61 is constantly positioned in the center of the groove 5 independent of the position of the laser beam 4. The tip position of the welding wire 61 inside the groove 5 was obtained by performing imaging analysis of an image photographed by the imaging camera 23 such as a CCD camera through an optical filter, and the position was adjusted by feeding it back to the filler metal control device 2 and the filler metal feeder 21. By this control, it can be avoided that the welding wire 61 is deposited on the side wall of the groove 5 in the previous layer of the weld bead and that feeding of the welding wire 61 is impeded in welding the following layer. In the first embodiment, sound welding is possible when the depth of the groove 5 is 100 mm or below and the width of the upper part of the groove is 10 mm or below.

In the first embodiment, the material of the material to be welded 100 was made SUS304, and the material of the welding wire 61 was made Y308L to match it, however combination of other materials may be employed. Also, the filler metal may be a welding rod so long as it is a solid filler metal whose position is controllable. With respect to the shielding gas 7, other inert gas and carbon dioxide, as well as gas mixture of inert gas and carbon dioxide or oxygen may also be employed. The positional relation of the shielding gas feeding device 3 and the filler metal feeder 21 may be opposite to that of the present embodiment with respect to the welding direction 11. The shape of the focused laser beam spot 41 does not need to be a circular shape that is the same as that of the present embodiment, and the focused laser beam spot of elliptical, linear, or rectangular shape may also be employed.

[Second Embodiment]

Figure 3:
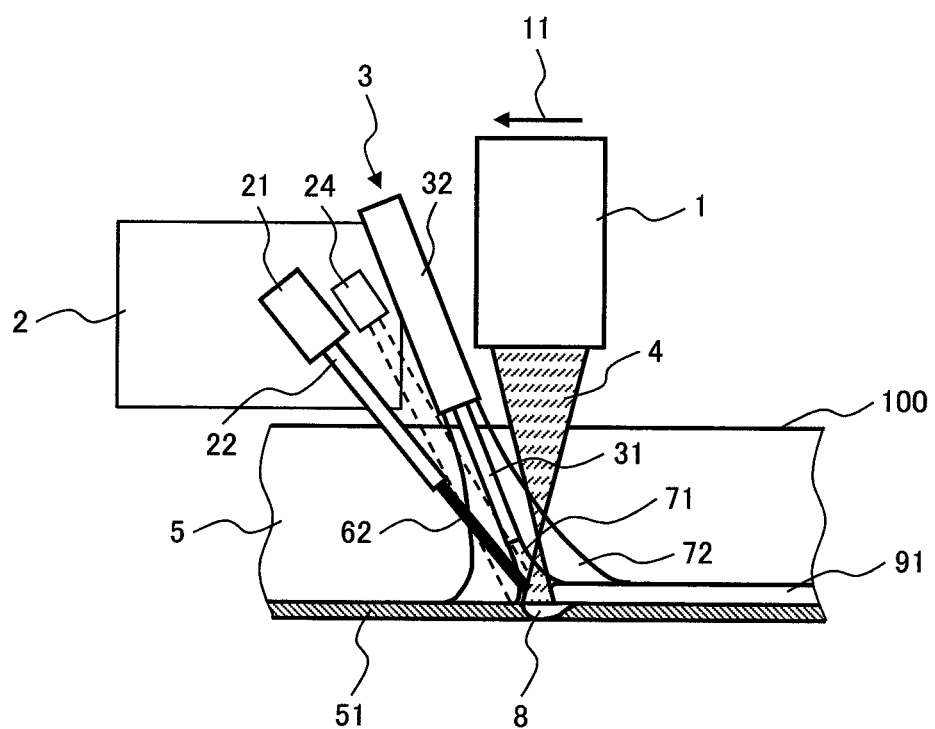
FIG. 3 is a schematic view showing a second embodiment of the present invention.

FIG. 3 is a schematic view showing the constitution of the welding apparatus and the welding process of a second embodiment of the present invention, and roughly shows the inside of the groove as viewed from a side in the welding direction. 1 is a laser beam irradiation head, 11 is a welding direction, 2 is a filler metal control device, 21 is a filler metal feeder, 22 is a filler metal feeding nozzle, 24 is a laser displacement meter, 3 is a shielding gas feeding device, 31 is an inner nozzle, 32 is an outer nozzle, 4 is a laser beam, 5 is a groove, 51 is the bottom of the groove, 62 is a welding rod as a solid filler metal, 71 is a flow of the shielding gas from the outer nozzle 31, 72 is a flow of shielding gas from the inner nozzle 32, 8 is a molten pool, 91 is a weld bead, and 100 is a material to be welded. In the present embodiment, the material of the material to be welded was SM400A (JIS), the material of the welding rod was YGT50 (JIS), and the shielding gas was carbon dioxide.

The welding rod 62 was fed to the molten pool 8 meltingly formed by the laser beam 4 from the front in the welding direction 11 by a filler metal feeder 21 through the filler metal feeding nozzle 22, and the weld bead 91 was formed. Then, metal vapor generated from the molten pool 8 is blown off by the flow 71 of the shielding gas ejected from the inner nozzle 31 of the shielding gas feeding device 3 toward the molten pool 8, and scattering of the laser beam 4 can be prevented. Also, oxidation of a heated region in the vicinity of the welding section by the air is suppressed by the flow 72 of the shielding gas ejected from the outer nozzle 32 toward the periphery of the molten pool 8.

Because the groove 5 becomes shallower as buildup of the weld bead 91 progresses, the tip position of the inner nozzle 31 is made to gradually go up, however it becomes possible that the flow 72 of the shielding gas ejected from the outer nozzle 32 is prevented from going out to the outside of the groove 5 and deterioration of sealing performance against the welding section is suppressed by arranging a mechanism maintaining the distance between the tip of the outer nozzle 32 and the upper end of the groove 5 constant.

Figure 4A:
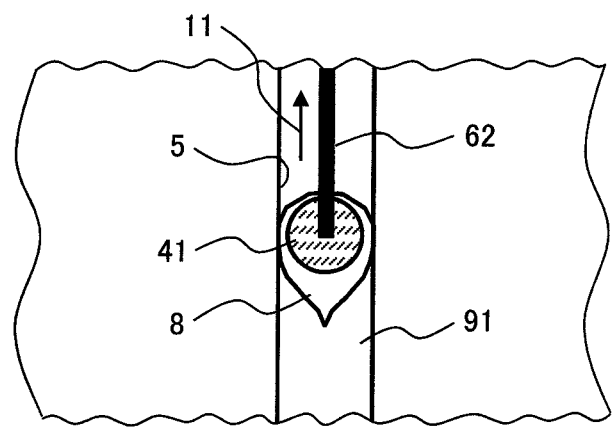
FIG. 4A is a schematic plan view showing a positional relation of the groove, the welding rod, and the reciprocating motion of the focal point position of the laser beam in the second embodiment of the present invention.
Figure 4B:
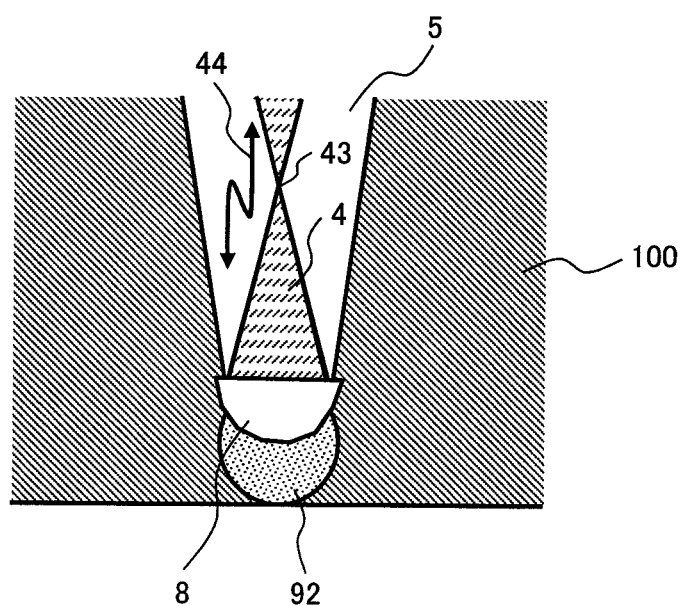
FIG. 4B is a schematic cross-sectional view showing a positional relation between the groove, the welding rod, and the reciprocating motion of the focal point of the laser beam in the second embodiment of the present invention.

FIG. 4A is a schematic plan view roughly showing the welding section as viewed from the upper part of the groove 5, and FIG. 4B is a schematic cross-sectional view roughly showing the cross-section orthogonal to the longitudinal direction of the groove 5 as viewed from the front in the welding direction 11. Reference numeral 11 shows the welding direction. Reference numeral 41 is a focused laser beam spot, 43 is a focal position of the laser beam 4, 44 is a vertical reciprocating motion direction of the focal position 43, and 21 is a weld bead of the previous layer.

By performing the control of reciprocatingly moving the focal position 43 of the laser beam 4 in the direction orthogonal to the bottom of the groove with predetermined amplitude in the direction of the reciprocating motion direction 44, changing the size of the focused laser beam spot 41 formed in the bottom of the groove 5, and periodically repeating the state the laser beam 4 is irradiated to only the bottom of the groove 5 and the state the laser beam is irradiated to the side wall also of the grove 5 while scanning the laser beam irradiation head 1 in the welding direction 11, lack of fusion that is possible to occur between the side wall of the groove 5 and the weld bead 91 can be suppressed. The amplitude of the reciprocating motion of the focal position 43 of the laser beam 4 was made such a value that changed the diameter of the focused laser beam spot 41 from approximately ½ of the groove width of the welding section to the groove width plus 4 to 5 mm, and the frequency of oscillation was made in the range of 1 to 5 Hz.

Then, by performing the periodical feed rate control in which the feed rate of the welding rod 62 is made local maximum when the size of the focused laser beam spot 41 becomes local minimum and the feed rate of the welding rod 62 is made local minimum when the size of the focused laser beam spot 41 becomes local maximum by the filler metal feeder 21 synchronizing with the period of the reciprocating motion of the focal position 43 of the laser beam 4, stable welding becomes possible without causing incomplete fusion of the welding rod 62.

With respect to the method of periodically changing the focused laser beam spot 41, in addition to the method of making the focal position 43 of the laser beam 4 reciprocatingly moving vertically as described in the present embodiment, a method of periodically changing the converging angle of the laser beam 4 by adjusting a light collection optical system formed by combination of lenses inside the laser beam irradiation head 1 may also be employed. The shape of the focused laser beam spot 41 is not necessarily to be a circular shape as the same to that of the present embodiment, and the focused laser beam spot of elliptical, linear, or rectangular shape may also be employed.

Also, by detecting the tip position of the welding rod 62 by the laser displacement meter 24 and adjusting the welding rod 62 so that the tip is constantly positioned in the center of the groove 5 by the filler metal feeder 21 regardless of the position and size of the focused laser beams spot 41, it can be avoided that the welding rod 62 is deposited on the side wall of the groove 5 and that feeding of the welding rod 62 is impeded in welding the following layer. The tip position of the welding rod 62 inside the groove 5 was obtained by two-dimensional cross-sectional imaging using the laser displacement meter 24, and the position was adjusted by feeding it back to the filler metal feeder 21. In the second embodiment, sound welding was possible when the depth of the groove 5 was 100 mm or below and the width of the upper part of the groove was 10 mm or below.

In the second embodiment, the material of the material to be welded 100 was made of SM400A and the material of the welding rod 62 was made of YGT50, however other materials may be employed. Also, the filler metal may be in the form of a welding wire.

With respect to the shielding gas 7, other inert gas and gas mixture of inert gas and carbon dioxide or oxygen may also be employed. The positional relation of the shielding gas feeding device 3 and the filler metal feeder 21 may be opposite to that of the present embodiment with respect to the welding direction 11.

The present invention can be utilized for welding of a thick plate in a large-sized structure for a power plant and a chemical plant, ship building, a heavy machine, and the like.

What is claimed is:

1. A laser narrow groove welding apparatus performing welding by scanning a laser beam in a welding direction while feeding a solid filler metal into a narrow groove made of a material to be welded and melting the solid filler metal and the material to be welded in a molten pool formed in the bottom of the groove, comprising:
    a laser beam irradiation head irradiating a laser beam in the bottom of the groove;
    a solid filler metal feeder feeding the solid filler metal to the molten pool in the bottom of the groove;
    a filler metal control device including a position detecting device detecting a tip position of the solid filler metal and adjusting a position of the solid filler metal independent of a motion of the laser beam irradiation head so that the tip of the solid filler metal is positioned in a center of the groove; and
    a shielding gas feeding device having an inner nozzle ejecting shielding gas to the molten pool and an outer nozzle forming a double tube structure accommodating the inner nozzle and ejecting the shielding gas to a periphery of the molten pool.

2. The laser narrow groove welding apparatus according to claim 1, wherein the laser beam irradiation head oscillates an irradiation position of the laser beam in the bottom of the groove with predetermined amplitude in parallel with the bottom of the groove.

3. The laser narrow groove welding apparatus according to claim 2, wherein the filler metal control device changes a feed rate of the solid filler metal by the solid filler metal feeder synchronizing with a period of oscillating of the irradiation position of the laser beam in the bottom of the groove.

4. The laser narrow groove welding apparatus according to claim 1, wherein the laser beam irradiation head changes a size of a focused laser beam spot in the bottom of the groove within a predetermined dimensional range.

5. The laser narrow groove welding apparatus according to claim 4 wherein the filler metal control device changes a feed rate of the solid filler metal by the solid filler metal feeder synchronizing with a period of changing of the size of a focused laser beam spot in the bottom of the groove.

6. The laser narrow groove welding apparatus according to claim 1, wherein the shielding gas feeding device positions the outer nozzle outside the groove and maintains a distance between a tip of the outer nozzle and an upper part of the groove at a predetermined interval.

7. The laser narrow groove welding apparatus according to claim 1, wherein the shielding gas feeding device maintains a distance between a tip position of the solid filler metal provided in the groove and a center position of a focused laser beam spot at a predetermined interval.

8. A laser narrow groove welding apparatus performing welding by scanning a laser beam in a welding direction while feeding a solid filler metal into a narrow groove made of a material to be welded and melting the solid filler metal and the material to be welded in a molten pool formed in the bottom of the groove, comprising:
    a laser beam irradiation head irradiating a laser beam in the bottom of the groove;
    a solid filler metal feeder feeding the solid filler metal to the molten pool;
    a filler metal control device including a position detecting device detecting a tip position of the solid filler metal and adjusting a position of the solid filler metal independent of a motion of the laser beam irradiation head so that the tip of the solid filler metal is positioned in a center of the groove; and
    a shielding gas feeding device having an inner nozzle ejecting shielding gas to the molten pool and an outer nozzle forming a double tube structure accommodating the inner nozzle and ejecting the shielding gas to a periphery of the molten pool;
    wherein the position detecting device is provided with an imaging camera which photographs the tip position of the solid filler metal, and obtains the tip position of the solid filler metal by analyzing an image photographed by the imaging camera by performing image analysis.

* * * * *